United States Patent
Leland et al.

(10) Patent No.: US 8,484,976 B2
(45) Date of Patent: Jul. 16, 2013

(54) SYSTEM, METHOD AND APPARATUS FOR FLUIDIC EFFECTORS FOR ENHANCED FLUID FLOW MIXING

(75) Inventors: Bradley C. Leland, Burleson, TX (US); David M. Wells, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1434 days.

(21) Appl. No.: 12/137,603

(22) Filed: Jun. 12, 2008

(65) Prior Publication Data
US 2009/0314885 A1 Dec. 24, 2009

(51) Int. Cl.
*F02C 7/24* (2006.01)
*B64C 1/40* (2006.01)
*B64C 23/00* (2006.01)

(52) U.S. Cl.
USPC ............................................. 60/725; 244/1 N

(58) Field of Classification Search
USPC .................. 244/1 N, 207, 208, 53 B; 60/262, 60/264, 271, 725, 202, 785, 786, 795, 771; 181/213, 215, 220, 296
See application file for complete search history.

(56) References Cited

U.S. PATENT DOCUMENTS

| | | | |
|---|---|---|---|
| 2,915,262 A * | 12/1959 | Klein ................................ 244/74 |
| 3,178,131 A * | 4/1965 | Laing ................................ 244/15 |
| 3,293,852 A * | 12/1966 | Galli et al. ........................ 60/202 |
| 3,442,350 A * | 5/1969 | O'Brien ........................ 181/221 |
| 3,508,561 A * | 4/1970 | Cornish ........................ 137/13 |
| 3,513,641 A * | 5/1970 | Arne et al. ........................ 55/306 |
| 4,010,018 A | 3/1977 | Kantor |
| 4,136,530 A | 1/1979 | Kantor |
| 4,155,850 A | 5/1979 | Rathbone et al. |
| 4,183,338 A | 1/1980 | Lindberg |
| 4,270,508 A | 6/1981 | Lindberg |
| 4,354,805 A | 10/1982 | Bauer |
| 4,367,639 A | 1/1983 | Kantor |
| 4,380,895 A | 4/1983 | Adkins |
| 4,432,778 A | 2/1984 | Parkinson et al. |
| 4,441,337 A | 4/1984 | Kantor |
| 4,524,587 A | 6/1985 | Kantor |
| 4,634,050 A | 1/1987 | Shippee |
| 4,862,837 A | 9/1989 | Holmes |
| 4,918,937 A | 4/1990 | Fineblum |
| 4,934,481 A * | 6/1990 | Friedrich ........................ 181/215 |
| 5,074,759 A | 12/1991 | Cossairt |
| 5,092,425 A * | 3/1992 | Shaw, Jr. ........................ 181/213 |
| 5,311,907 A | 5/1994 | Houck |
| 5,353,652 A | 10/1994 | Houck |
| 5,393,501 A | 2/1995 | Clawson et al. |
| 5,428,954 A * | 7/1995 | Cowan, Sr. ........................ 60/262 |
| 5,455,005 A | 10/1995 | Clawson et al. |
| 5,761,900 A * | 6/1998 | Presz, Jr. ........................ 60/262 |
| 5,821,472 A * | 10/1998 | Zwernemann ................ 181/215 |
| 6,129,309 A * | 10/2000 | Smith et al. ................ 244/53 B |
| 6,615,857 B1 | 9/2003 | Sinha et al. |
| 7,966,831 B2 * | 6/2011 | Kraft et al. ........................ 60/785 |
| 2011/0030341 A1 * | 2/2011 | Huber et al. .................... 60/264 |
| 2011/0214433 A1 * | 9/2011 | Feindel et al. .................. 60/796 |

* cited by examiner

Primary Examiner — Tien Dinh
Assistant Examiner — Valentina Xavier
(74) Attorney, Agent, or Firm — Bracewell & Giuliani LLP

(57) ABSTRACT

A fluidic effector provides enhanced plume mixing for an aircraft engine. Air jet injectors are located on both the external and internal cowl surfaces and angled in opposite directions to induce large scale vortices in the exhaust plume. The vortices mix actuation air with the exhaust plume to produce ejector action. The plume mixes out quickly, thereby lowering jet noise and jet exhaust temperature. The injectors have orientations and injection rates that are adjustable to allow variable mixing rates for use at different flight and engine conditions.

18 Claims, 5 Drawing Sheets

SYSTEM, METHOD AND APPARATUS FOR FLUIDIC EFFECTORS FOR ENHANCED FLUID FLOW MIXING

BACKGROUND OF THE INVENTION

1. Technical Field

The present invention relates in general to abating noise during the release of high pressure fluids and, in particular, to an improved system, method and apparatus for fluidic effectors that provide enhanced exhaust plume mixing for jet engines.

2. Description of the Related Art

A nozzle exhaust has high temperature and high velocity. The high temperature of the exhaust plume reduces the durability of the nozzle material, and the high velocity produces a significant amount of jet noise. As shown in FIG. 5, a conventional nozzle 51 produces an exhaust plume 53 having a core 55. Small-scale eddies 57 produce high frequency noise downstream from nozzle 51, and large-scale eddies 59 produce low frequency noise further downstream from nozzle 51.

A common way to reduce the exhaust plume temperature and the jet noise is to use an ejector nozzle. Ejector nozzles mix ambient air with the nozzle exhaust. This type of nozzle is typically heavy, bulky and complex, and inherently reduces performance of the engine.

For example, FIG. 1 depicts an aircraft nozzle 11 that incorporates an internal ejector mixer. A lobed mixer 13 (FIG. 2) also may be included. A scoop 15 is formed in the nozzle 1 to duct ambient air flow 17 into the exhaust stream 19. The exhaust stream and the ambient air channeled through multiple lobes 21 in the mixer 13 that alternate hot and cold jets to mix the fluids within a constrained duct 23. However, ejector nozzle 11 may be located internally or externally with respect to a jet engine. To incorporate this design inside a jet engine, the internal nozzle geometry is typically modified to a larger diameter than the basic engine. As a result, this solution requires a heavier and more expensive configuration to handle the thermal environment. This design also has an associated thrust-loss penalty at the nozzle (i.e., internal) and a drag penalty (i.e., externally) because of the increase in size requirements.

FIG. 3 illustrates an ejector nozzle solution having delta-shaped tabs 31 (e.g., one shown) protruding into the core exhaust stream at the nozzle exit 33. This design produces many small vortex pairs and has an associated thrust-loss penalty as the exit flow is impeded. Moreover, this solution has limited applicability due to the extreme thermal environment inflicted on the tabs 21.

FIG. 4 depicts one or more saw-toothed trailing edges 41, 43 (e.g., two shown) on an aircraft engine 45. Depending on the application and by-pass ratio (BPR), this design imparts weight penalties and constant drag. In addition, this solution generates the least beneficial stream-wise vorticity of these conventional designs. Thus, an improved design for fluidic ejector nozzles that provides enhanced plume mixing would be desirable.

SUMMARY OF THE INVENTION

Embodiments of a system, method and apparatus for fluidic effectors that provide enhanced plume mixing. The invention may comprise a fluidic effector having one or more rows of angled air jet injectors on both the external and internal nozzle/cowl surfaces. With the injectors angled in opposite directions, large scale vortices are induced and sustained. These vortices mix actuation air with the exhaust plume to produce ejector action. The plume mixes out quickly, thereby lowering jet noise and jet exhaust temperature.

The invention is also well suited for any application having a high velocity jet stream, such as steam valves and high pressure blow-off valves typically used in chemical or petroleum industrial environments. Microturbines also benefit from more efficient exhaust systems that require less volume and losses. For example, microturbine applications include distributed heat and power applications, hybrid electric vehicles, gas turbines or turbo generators used for power generation or as seagoing vessel power plants.

Instead of mechanical actuation (e.g., tabs, lobes, etc.), embodiments of the invention use fluidic injectors that can be positioned in the hot gas stream to mix the actuation and exhaust air flows. For example, synthetic, engine compressor-bleed or engine fan-bypass air flow may be provided to the fluidic injectors. The invention increases the shear magnitude between the two fluid streams, and forces greater rotation (i.e., vorticity) and increases penetration of the streams into each other than can be achieved with conventional designs.

The stream-wise vortices generated have more momentum (i.e., an increased mixing rate) and are able to penetrate further into the exhaust plume since more surface area is available for mixing to occur. The mixing also persists longer because of the increased surface area, resulting in the generation of a uniform velocity aft of the nozzle faster and more affordably than with traditional methods.

The jet arrays may be tailored with respect to orientation and injection rate, or adjusted to allow variable mixing rates for use at different flight and engine conditions. For example, the system may be adjusted for aircraft take-off low level approach or cruise at altitude. The fluidic ejector system may be turned on and off as needed, so the performance penalties are not carried at all flight conditions. In contrast to the heavy, bulky and complex conventional ejector nozzles, this design is simpler and much lighter in weight. The acoustic and thermal reduction benefits are attractive for non-aviation applications as well, such as other gas turbine applications like power generation and industrial applications involving high pressure fluids.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 6-10, embodiments of a system, method and apparatus for fluidic effectors that provide enhanced plume mixing are disclosed. In one embodiment, the invention may be used in an aircraft 61 (FIG. 6) having an engine exhaust system 63. The invention is well suited for abating noise and reducing the exhaust temperature during the emission of the high pressures, velocities and temperatures of the fluids from the engine exhaust system. Although the invention is depicted in use with round engine exhaust nozzles in FIGS. 6 and 7, other shapes such as elliptical and trapezoidal nozzles (see FIGS. 9 and 10) are also suitable for use with the invention.

Figure 1:
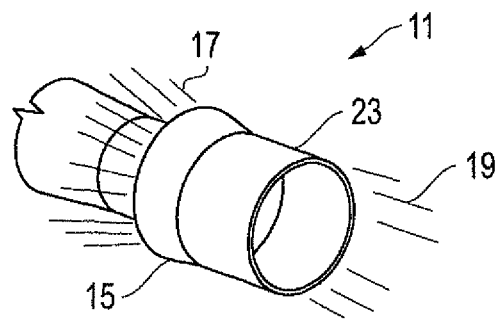
FIG. 1 is an isometric view of a conventional ejector nozzle.
Figure 2:
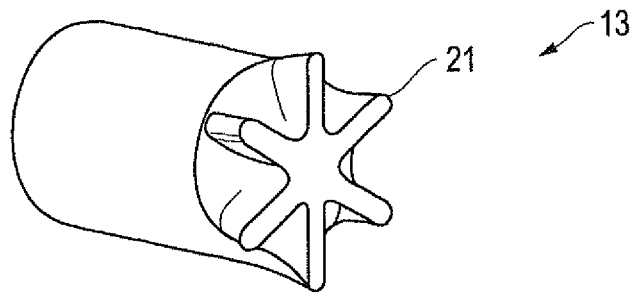
FIG. 2 is an isometric view of a conventional lobed mixer for the nozzle of FIG. 1.
Figure 3:
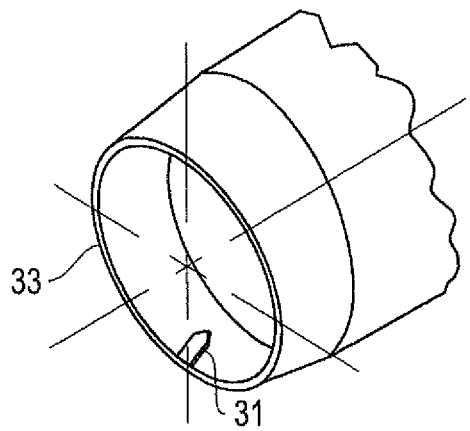
FIG. 3 is a partial isometric view of another conventional ejector nozzle design.
Figure 4:
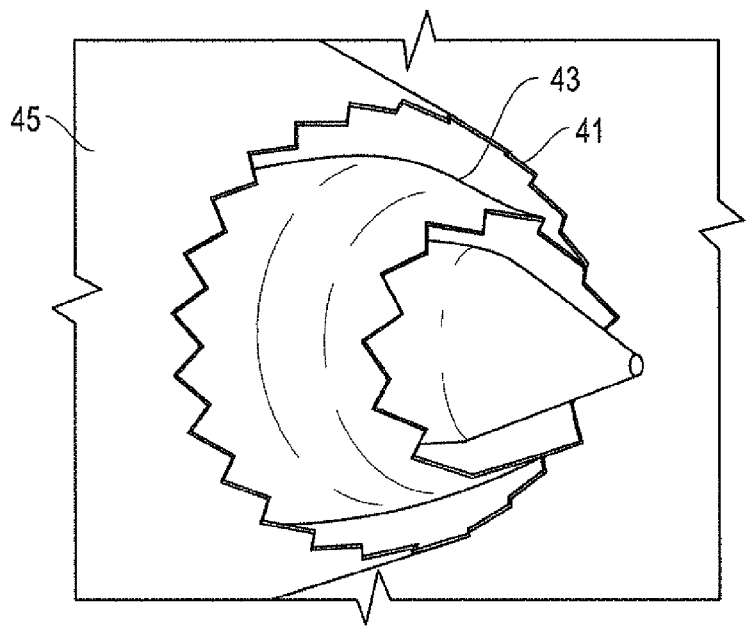
FIG. 4 is an isometric view of an aircraft engine that incorporates another conventional ejector nozzle design.
Figure 5:
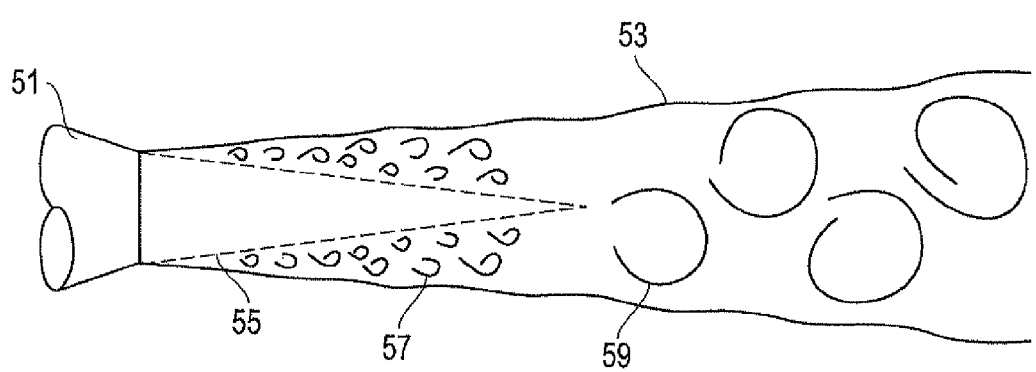
FIG. 5 is a schematic side view of a conventional nozzle and exhaust plume.
Figure 6:
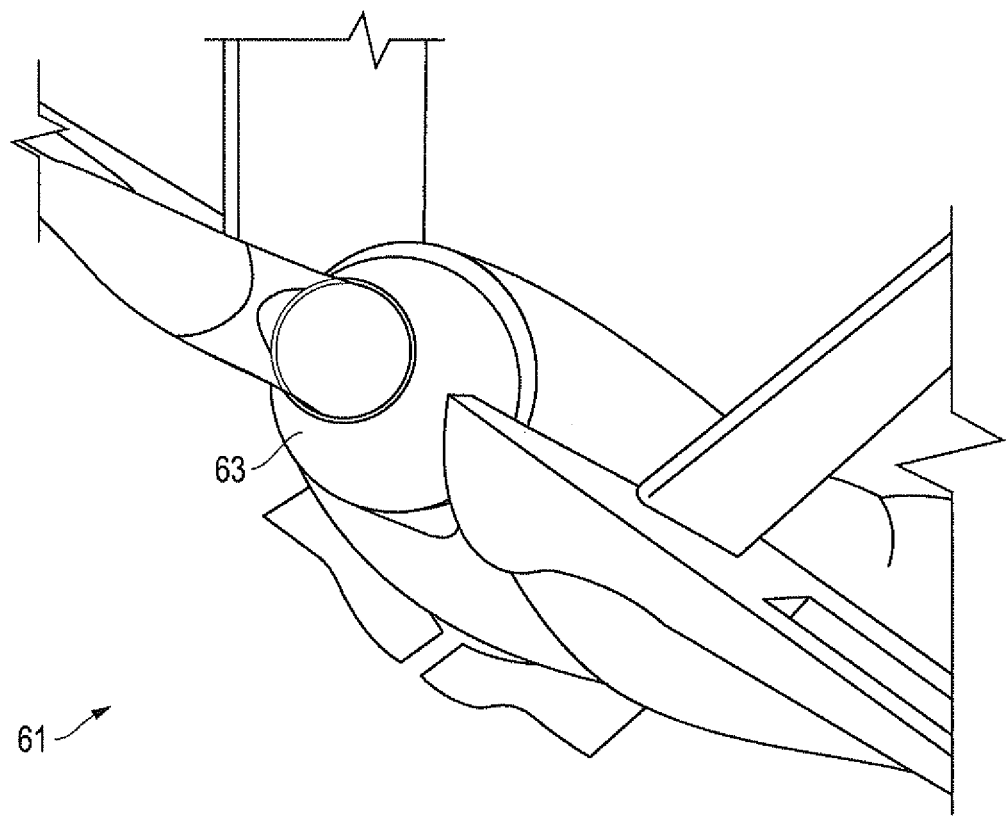
FIG. 6 is an isometric view of one embodiment of an aircraft constructed in accordance with the invention.
Figure 7:
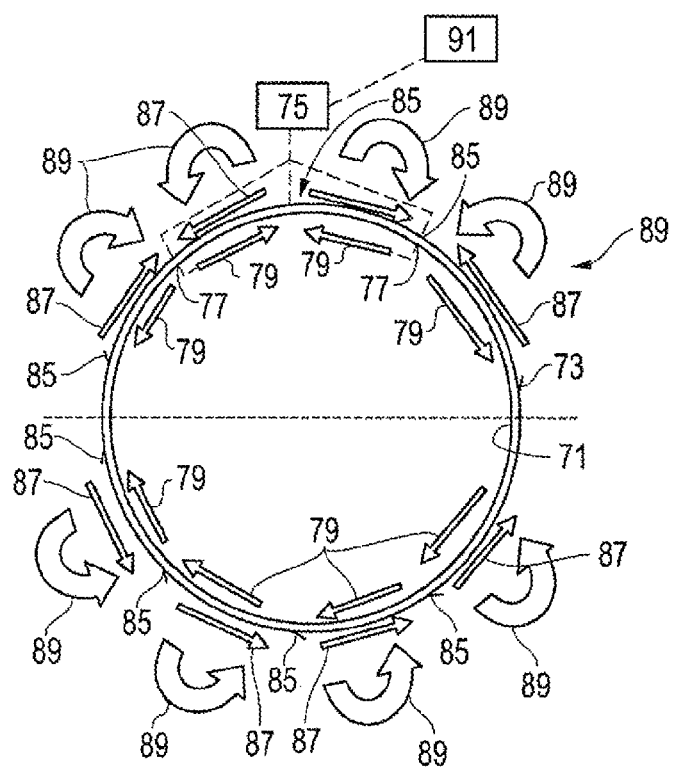
FIG. 7 is a split schematic end view of two embodiments of an exhaust nozzle of the aircraft of FIG. 6 and is constructed in accordance with the invention.
Figure 8:
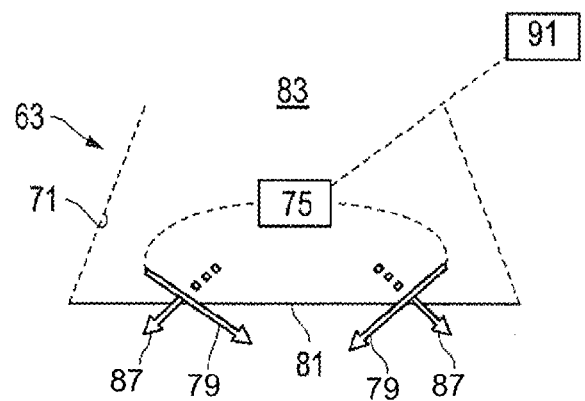
FIG. 8 is a schematic top view of the exhaust nozzle of FIG. 7 and is constructed in accordance with the invention.

As shown in FIGS. 7 and 8, the engine exhaust system 63 has a nozzle or aperture 81 (FIG. 8) with an inner surface 71 and an outer surface 73. Depending on the application, the aperture may comprise the engine exhaust nozzle exit lip which is located aft of the nozzle throat 83 and any other location near areas where exhaust-washed and external surfaces meet. A source of actuation air 75 is provided for the engine exhaust system. The source of the flow of actuation air may comprise synthetically-generated or engine compressor-bleed or fan-bypass air flow.

At least one inner effectors or air jets 77 (a plurality is shown) is mounted to the engine exhaust system adjacent the aperture at the inner surface 71. The inner effectors 77 are coupled to the source of actuation air 75 for emitting an inner air jet stream 79 through the inner effectors 77 in a first direction. Two different embodiments are depicted in the upper and lower halves of FIG. 7. The upper configuration of FIG. 7 generates large counter-rotating vortex pairs that persist over time and have a longer duration. The lower configuration of FIG. 7 generates smaller regions of vorticity, but may be desirable in some applications.

Figure 9:
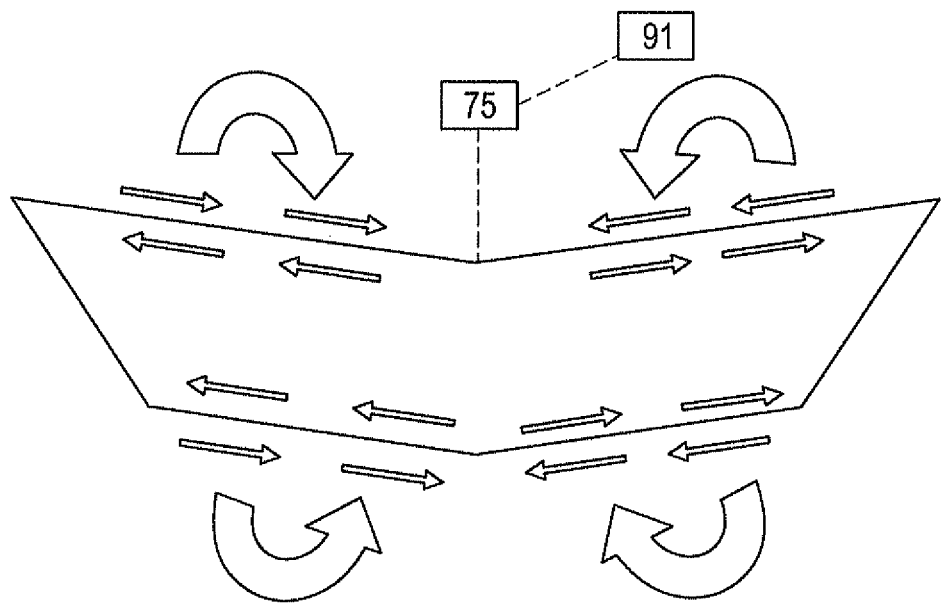
FIGS. 9 and 10 are schematic end views of other embodiments of exhaust nozzles constructed in accordance with the invention.
Figure 10:
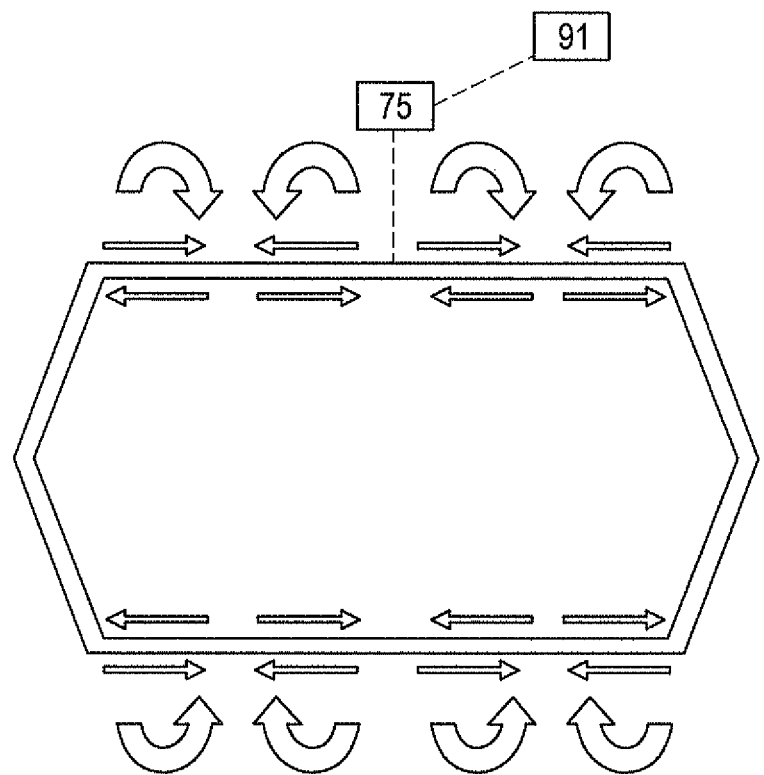

As shown in FIGS. 7, 8 and 9, the inner effectors 77 may emit the inner actuation air flow 79 in similar or different directions. Directional characteristics and flow rate of the actuation air flow, such as jet azimuth, elevation and mass flow, can be tailored for specific integrations to allow an optimized system. FIG. 9 illustrates the effect of multiple jet arrays that may be used to set up a large scale vortex on each "edge" of the aperture.

The engine exhaust system 63 also comprises at least one outer ejector effector 85 (a plurality is shown) that is mounted thereto adjacent the aperture at the outer surface 73. The outer effectors 85 also are coupled to the source of actuation air 75 for emitting an outer air jet stream 87 through the outer effectors 85 in a second direction that is different than (e.g., opposing) the first direction. The inner and outer effector air flows 79, 87 combine with the fluid flow from the engine exhaust and the free stream air to reduce a noise level generated by the device. The actuation air flows from the inner and outer effectors provide enhanced plume mixing to induce and sustain large scale vortices 89 (FIG. 7), and reduce an exhaust temperature generated by the engine exhaust.

In some embodiments, each of the inner and outer effectors 77, 85 comprises a row of angled air jet injectors on the internal and external cowl surfaces 71, 73, respectively, of the engine exhaust nozzle. At least some of the angled air jet injectors 77 on the internal cowl surface 71 may be positioned in the hot gas stream. The inner and outer effectors increase a shear magnitude between the fluid flow (e.g., exhaust) and the flow of actuation air, force vorticity and increase penetration of the fluid flow and actuation air flows into each other.

In other embodiments, the invention further comprises controls 91 for adjusting a mixing rate between the fluid flow and the actuation air flow based on flight conditions of the aircraft, or power setting of the engine, including selectively activating and deactivating the system based on need for the system. The controls 91 may further comprise controlling an air jet orientation and injection rate of actuation air flow through the inner and outer fluidic effectors 77, 85, depending on the application.

The invention provides numerous advantages. For example, in some embodiments the mixing rate of multiple fluid streams of differing velocities is enhanced to reduce jet noise and thermal impact to airframe surfaces, as well as increase propulsive efficiency. Entrainment of surrounding free stream air is increased without adding the weight and complexity of a traditional ejector or noise suppressor integration. The reliability, maintainability and supportability of such a system has reduced life cycle costs, and reduces the vehicle drag associated with current noise and thermal abatement systems. The present design also has increased applicability to all engines with any bypass ratio (BPR) and any installation (e.g., fuselage-integrated or pod configurations). Although most commercial aircraft engine designs have a medium to high BPR, and military designs are typically less than one, the invention is well suited for both applications.

While the invention has been shown or described in only some of its forms, it should be apparent to those skilled in the art that it is not so limited, but is susceptible to various changes without departing from the scope of the invention. For example, even through the invention has been shown and described in use with aircraft or other gas turbine propulsion integrations, the device that employs the invention also may comprise a valve, such as a steam valve, high pressure blow-off valve, etc., typically used in chemical or petroleum industrial environments. Microturbines also benefit from more efficient exhaust systems that require less volume and losses. For example, microturbine applications include distributed heat and power applications, hybrid electric vehicles, gas turbines or turbo generators used for power generation or as seagoing vessel power plants.

What is claimed is:

1. A system for abating noise during emission of high pressure fluid, comprising:
    a device that emits a fluid flow at a high pressure through an aperture having an inner surface and an outer surface, the device comprising one of the following: an aircraft turbine engine, a turbine of a turbo generator, a microturbine, and seagoing vessel turbine power plant;
    a source of actuation air;
    an inner fluidic effector mounted to the device adjacent the aperture at the inner surface, the inner fluidic effector coupled to the source of actuation air for emitting an inner actuation air flow through the inner fluidic effector in a first direction;
    an outer fluidic effector mounted to the device adjacent the aperture at the outer surface, the outer fluidic effector coupled to the source of actuation air for emitting an outer actuation air flow through the outer fluidic effector in a second direction that is different than the first direction;

the inner and outer fluidic effectors are positioned to increase a shear magnitude between the fluid flow and the flow of actuation air, force vorticity and increase penetration of the fluid flow and actuation air flows into each other; and the inner and outer actuation air flows combine with the fluid flow to reduce a noise level generated by the device.

2. A system according to claim 1, wherein the inner actuation air flow has a directional component that is predominately tangential to the inner surface of the device and that is substantially transverse to a direction of the fluid flow of the device, wherein the outer actuation air flow has a directional component that is predominately tangential to the outer surface of the device and that is substantially transverse to the direction of the fluid flow of the device, and wherein the substantially transverse portion of the directional component of the inner and outer actuation air flows are in opposing directions at adjacent locations along a common radial axis.

3. A system according to claim 1, wherein the fluid flow of the device comprises an exhaust, and the inner and outer actuation air flows comprise jets that combine with the exhaust and a free stream fluid flow.

4. A system according to claim 1, wherein the device is an aircraft, further comprising a controller configured to perform the operations of adjusting a mixing rate between the fluid flow and the actuation air flow based on flight conditions of the aircraft, including selectively activating and deactivating the system.

5. A system according to claim 1, wherein the inner and outer fluidic effectors are positioned to provide enhanced plume mixing to induce and sustain large scale vortices, and reduce an exhaust temperature generated by the device.

6. A system according to claim 1, wherein each of the inner and outer fluidic effectors comprises a row of angled air jet injectors on internal and external cowl surfaces of an aircraft engine nozzle, respectively.

7. A system according to claim 6, wherein the fluid flow is a hot gas stream, and at least some of the angled air jet injectors on the internal cowl surface are positioned in the hot gas stream.

8. A system according to claim 1, wherein the flow of actuation air is selected from the group consisting essentially of synthetic, engine compressor-bleed and fan-bypass air flow.

9. A system according to claim 1, further comprising a controller configured to perform the operations of controlling an orientation and injection rate of actuation air flow through the inner and outer fluidic effectors.

10. An aircraft, comprising:
a jet engine that emits an exhaust at a high pressure, velocity and temperature through a nozzle having an inner surface and an outer surface;
a source of actuation air;
an inner fluidic effector mounted to the jet engine adjacent the nozzle at the inner surface, the inner fluidic effector coupled to the source of actuation air for emitting an inner actuation air flow through the inner fluidic effector in a first direction;
an outer fluidic effector mounted to the jet engine adjacent the nozzle at the outer surface, the outer fluidic effector coupled to the source of actuation air for emitting an outer actuation air flow through the outer fluidic effector in a second direction that is different than the first direction; and
the inner and outer actuation air flows comprise jets that combine with the exhaust and a free stream fluid flow, and the inner and outer actuation air flows combine with the exhaust to reduce a noise level and an exhaust plume temperature generated by the jet engine, and increase a propulsive efficiency of the jet engine.

11. An aircraft according to claim 10, wherein the inner actuation air flow has a directional component that is predominately tangential to the inner surface of the device and that is substantially transverse to a direction of the fluid flow of the device, wherein the outer actuation air flow has a directional component that is predominately tangential to the outer surface of the device and that is substantially transverse to the direction of the fluid flow of the device, and wherein the substantially transverse portion of the directional component of the inner and outer actuation air flows are in opposing directions at adjacent locations along a common radial axis.

12. A aircraft according to claim 10, further comprising a controller configured to perform the operations of adjusting a mixing rate between the exhaust and the actuation air flow based on flight conditions of the aircraft, including selectively activating and deactivating the system.

13. A aircraft according to claim 10, wherein the inner and outer fluidic effectors provide enhanced plume mixing to induce and sustain large scale vortices, and reduce an exhaust temperature generated by the jet engine.

14. A aircraft according to claim 10, wherein each of the inner and outer fluidic effectors comprises a row of angled air jet injectors on internal and external cowl surfaces of the nozzle, respectively.

15. A system according to claim 14, wherein at least some of the angled air jet injectors on the internal cowl surface are positioned in the exhaust.

16. A aircraft according to claim 10, wherein the flow of actuation air is selected from the group consisting essentially of synthetic, engine compressor-bleed and fan-bypass air flow.

17. A aircraft according to claim 10, wherein the inner and outer fluidic effectors are positioned to increase a shear magnitude between the exhaust and the flow of actuation air, force vorticity and increase penetration of the exhaust and actuation air flows into each other.

18. A aircraft according to claim 10, further comprising a controller configured to perform the operations of controlling an orientation and injection rate of actuation air flow through the inner and outer fluidic effectors.

\* \* \* \* \*